United States Patent
Hayashi

(10) Patent No.: US 9,418,435 B2
(45) Date of Patent: Aug. 16, 2016

(54) THREE-DIMENSIONAL MEASUREMENT METHOD

(75) Inventor: Tadashi Hayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1107 days.

(21) Appl. No.: 13/508,902

(22) PCT Filed: Nov. 10, 2010

(86) PCT No.: PCT/JP2010/006595
§ 371 (c)(1),
(2), (4) Date: May 9, 2012

(87) PCT Pub. No.: WO2011/058742
PCT Pub. Date: May 19, 2011

(65) Prior Publication Data
US 2012/0224033 A1    Sep. 6, 2012

(30) Foreign Application Priority Data

Nov. 12, 2009 (JP) .................. 2009-259025
Oct. 26, 2010 (JP) .................. 2010-239980

(51) Int. Cl.
*H04N 13/02* (2006.01)
*G06T 7/00* (2006.01)

(52) U.S. Cl.
CPC .................... *G06T 7/0075* (2013.01)

(58) Field of Classification Search
CPC .................................... G06T 7/0075
USPC ......................................... 348/47
See application file for complete search history.

(56) References Cited

U.S. PATENT DOCUMENTS

| 5,768,443 A | 6/1998 | Michael et al. |
| 2002/0029127 A1* | 3/2002 | Wakashiro .................. 702/152 |

(Continued)

FOREIGN PATENT DOCUMENTS

| CN | 1561502 A | 1/2005 |
| CN | 101231754 A | 7/2008 |

(Continued)

OTHER PUBLICATIONS

Richard Hartley and Andrew Zisserman, "Multiple View Geometry in Computer Vision Second Edition", Cambridge University Press, Mar. 2004, pp. 219-243 (Chapter 8).

(Continued)

*Primary Examiner* — Gims Philippe
*Assistant Examiner* — Benjamin Pezzner
(74) *Attorney, Agent, or Firm* — Canon USA Inc. IP Division

(57) ABSTRACT

A field of view available for stereo measurement is expanded using a field of view other than a common field of view. To this end, a plane (plane e) including a corresponding point (xa) on a sensor plane of a first camera, which corresponds to a feature point (X), a focal position (F1) of the first camera, and a focal position (F2) of the second camera is calculated; a first line (straight line E) that is a line of intersection of the plane (plane e) and a plane including a sensor plane of the second camera is calculated; a second line (straight line G) including a corresponding point group on the sensor plane of the second camera, which corresponds to a feature point group, is calculated; an intersection of the first and second lines is calculated as a corresponding point (xb) on the plane including the sensor plane of the second camera, which corresponds to the feature point (X); and three-dimensional coordinates of the feature point (X) are calculated based on the corresponding points (xa, xb).

10 Claims, 25 Drawing Sheets

(56) References Cited

U.S. PATENT DOCUMENTS

| | | | | |
|---|---|---|---|---|
| 2004/0096082 A1* | 5/2004 | Nakai et al. | | 382/104 |
| 2004/0184656 A1 | 9/2004 | Anei Shin | | |
| 2004/0234124 A1 | 11/2004 | Nakai et al. | | |
| 2005/0089213 A1* | 4/2005 | Geng | | 382/154 |
| 2006/0083421 A1* | 4/2006 | Weiguo et al. | | 382/154 |
| 2007/0242872 A1* | 10/2007 | Rudin et al. | | 382/154 |
| 2008/0118143 A1* | 5/2008 | Gordon et al. | | 382/154 |

FOREIGN PATENT DOCUMENTS

| | | |
|---|---|---|
| EP | 1619623 A1 | 1/2006 |
| JP | 6-75149 A | 3/1994 |
| JP | 2004-255074 A | 9/2004 |
| JP | 2005-309782 A | 11/2005 |
| JP | 2007-232389 A | 9/2007 |

OTHER PUBLICATIONS

Zhengyou Zhang, "Determining the Epipolar Geometry and Its Uncertainty: A Review", International Journal of Computer Vision, Mar. 1, 1998, pp. 161-195, vol. 27, No. 2, Kluwer Academic Publishers, Norwell, U.S.

Richard Hartley and Andrew Zisserman, "Epipolar Geometry and the Fundamental Matrix", Multiple View Geometry in Computer Vision, Jan. 1, 2003, Chapter 8, pp. 219-243, Cambridge University Press.

Ruimin Wu, "Binocular Stereo Vision Measurement Technology for Large Size and High Temperature Forging", Chinese Master's Theses Full-text Database Information Science and Technology, Apr. 16, 2009, pp. 14-16, 52 and 53.

Sekhavat Sharghi and Farhad Manangar, "Stereo Correspondence Using Geometric Relational Matching", Department of Computer Science and Engineering, University of Texas, Part of the IS&T/SPIE Conference on Visual Communications and Image Processing '99, Jan. 1999, SPIE vol. 3653, pp. 582-592.

Li Haichao and Zhang Guangjun, "Fast Stereo Edge-Matching Algorithm Based on Corner-Guidance", Journal of Beijing University of Aeronautics and Astronautics, May 2007, vol. 33, No. 5, pp. 557-560.

* cited by examiner

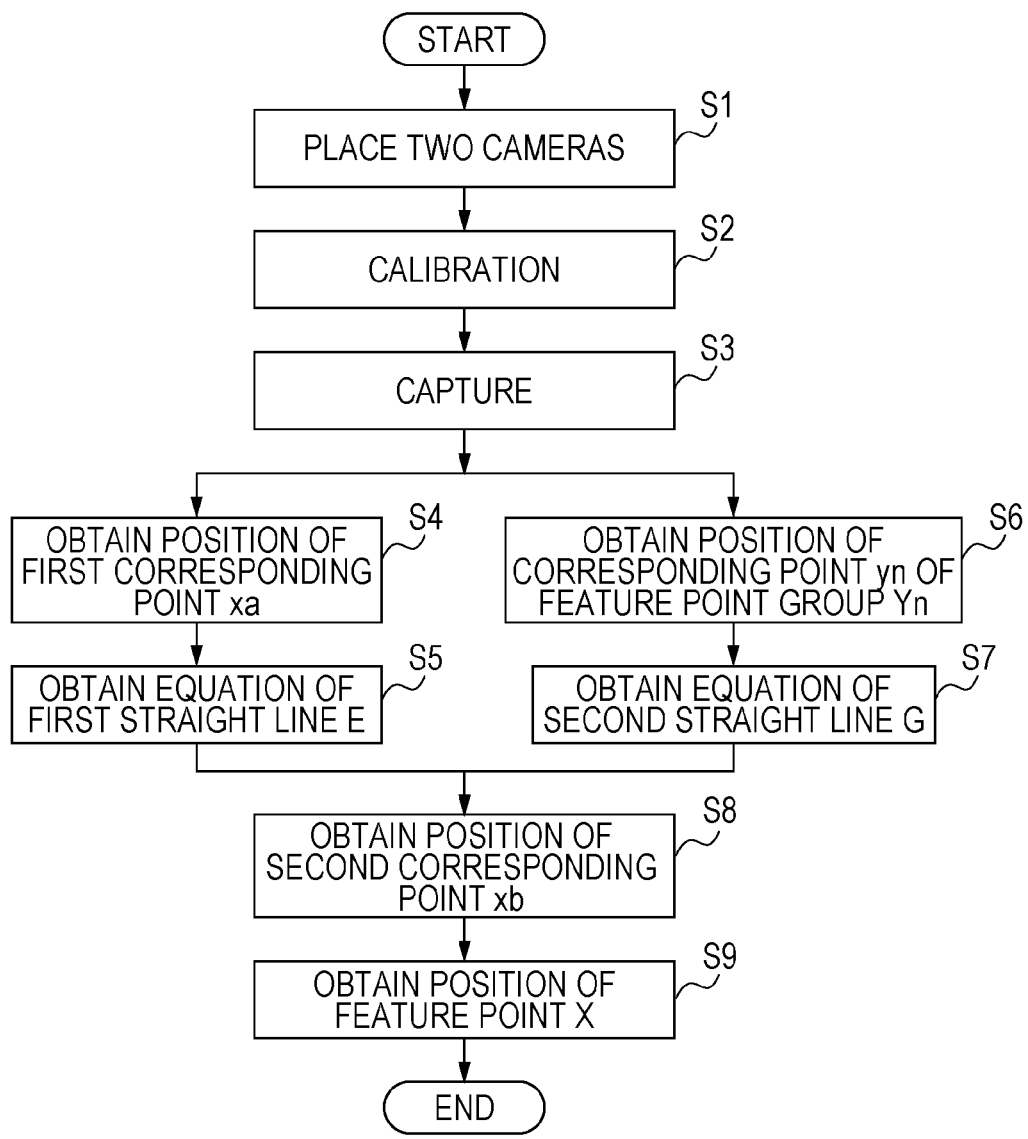

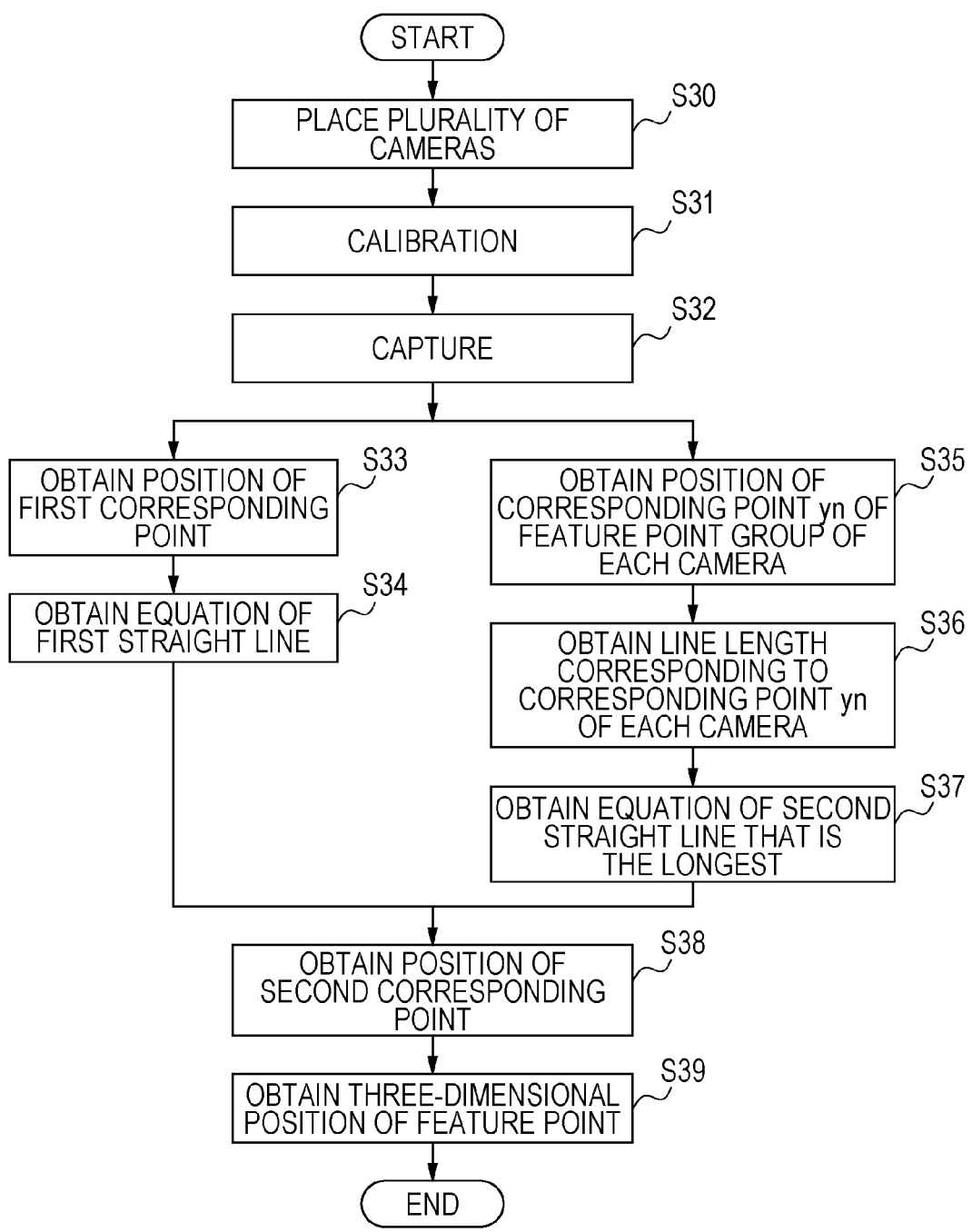

THREE-DIMENSIONAL MEASUREMENT METHOD

CROSS REFERENCE TO RELATED APPLICATIONS

This application is a National Stage filing of PCT Application No. PCT/JP2010/006595 filed Nov. 10, 2010, which claims priority from Japanese Patent Application No. 2009-259025 filed Nov. 12, 2009, and Japanese Patent Application No. 2010-239980 filed Oct. 26, 2010, the disclosures of each of which are hereby incorporated by reference herein in their entirety.

TECHNICAL FIELD

The present invention relates to a three-dimensional measurement method using a stereo camera.

BACKGROUND ART

A method using two cameras, called a stereo measurement method, is available to measure the three-dimensional coordinates of a feature point such as a corner of a product. In the stereo measurement method, as illustrated in a flow given below, three-dimensional measurement is performed using four steps to measure the three-dimensional coordinates of a feature point of a certain product:

Step 101 (calibration): The image distortion produced by the cameras is corrected in advance using an accurate calibration chart, and the focal positions of the two cameras and the relative positions of the respective sensor planes of the two cameras are determined.

Step 102 (image capture): Images are captured using the two cameras so that a feature point appear in the images.

Step 103 (find corresponding points): The three-dimensional coordinates of corresponding points corresponding to the feature point on the respective sensor planes are found using pattern matching or the like.

Step 104 (triangulation): The three-dimensional coordinates of the feature point are measured by performing three-dimensional measurement using a triangulation method from the two corresponding points determined in Step 103.

In the image capture processing of Step 102, it is necessary for the two cameras to have a common field of view. A narrow-angle lens having a narrow angle of view is used for high-accuracy measurement, which may be advantageous for the high measurement resolution. Unfortunately, the common field of view is small, resulting in a narrow range of three-dimensional measurement. Even with the use of a wide-angle lens, the close-up conditions provide a small common field of view and a narrow range of three-dimensional measurement for improved accuracy. Therefore, there is a trade-off between a high measurement accuracy and a wide measurement range.

To address the trade-off, PTL 1 discloses a method for providing a wide range of three-dimensional measurement by simulating movement of the human eyeball. In PTL 1, FIG. 3 of PTL 1 illustrates a camera in which a wedge prism is placed in front of a lens and the wedge prism is rotated to deflect the optical axis so that the capture position of each camera unit can be changed. Further, a combination of two wedge prisms allows independent control of the magnitude of a deflection angle (phi) and a deflection position (theta). The two camera units each including the above mechanism are used, and the fields of view are synchronously driven to scan the common field of view, thus ensuring a wide range of three-dimensional measurement. As disclosed in PTL 1, each camera unit captures an image using a narrow-angle lens so as to provide a sufficient accuracy or captures an image in a close-up mode, thus achieving both the high measurement accuracy and the wide measurement range.

Further, a method that allows independent control of the magnitude of a deflection angle and a deflection position to provide high-accuracy three-dimensional measurement even under bad capture conditions where vibration constantly occurs such as in a case where a three-dimensional measurement device is mounted in a robot arm or the like is also disclosed.

However, in three-dimensional measurement using the device disclosed in PTL 1, the wedge prisms are rotated to change the capture positions of the camera units. Thus, in addition to the normal two cameras, a mechanism including motors, gears, and prisms and a control circuit therefor may be required. Further, synchronous driving of a total of four prisms using two camera units may require four circuits each for controlling the driving of a motor capable of high-performance synchronization, leading to an increase in the size of a substrate for camera control. Furthermore, measurement may require the positioning time for driving the prisms, and an additional measurement time may be required accordingly.

Therefore, if the stereo measurement method disclosed in PTL 1 and a device using the method are mounted in a robot arm or the like, the mechanism or control circuits described above may be required in addition to two camera units, which may hinder downsizing of a robot arm having a stereo camera in terms of weight and size.

CITATION LIST

Patent Literature

PTL 1: Japanese Patent Laid-Open No. 6-75149

SUMMARY OF INVENTION

Accordingly, the present invention provides a three-dimensional measurement method which is suitable to be mounted in a robot hand without increasing the size, the weight, and the driving measurement time, in which the high accuracy and the wide measurement range can be achieved without additional special mechanism or circuit.

An aspect of the present invention provides a three-dimensional measurement method for measuring three-dimensional coordinates of a feature point of a product using at least two cameras in accordance with a stereo measurement method, including the steps of capturing the feature point using a first camera, and capturing a feature point group continuous with the feature point using a second camera; calculating a plane including a corresponding point on a sensor plane of the first camera, the corresponding point corresponding to the feature point, a focal position of the first camera, and a focal position of the second camera, and calculating a first line that is a line of intersection of the calculated plane and a plane including a sensor plane of the second camera; calculating a second line including a corresponding point group on the sensor plane of the second camera, the corresponding point group corresponding to the feature point group; calculating a corresponding point on the plane including the sensor plane of the second camera, the corresponding point corresponding to the feature point, by determining an intersection of the first line and the second line; and calculating a straight line extending through the corresponding point on the sensor plane of the first camera and the focal position of the first camera, and a straight line extending through the corresponding point group on the sensor plane of the second camera and the focal position of the second camera, and calculating an intersection of the calculated straight lines as three-dimensional coordinates of the feature point.

The three-dimensional measurement method configured as above according to the aspect of the present invention can provide a wider range of measurement.

The two cameras may not necessarily have a common field of view. Therefore, utilizing fields of view of the cameras other than a common field of view does not require a wide-angle lens for obtaining a wide range of measurement as may be required in the related art, resulting in high-accuracy measurement which makes use of the resolution of sensors.

Furthermore, unlike the technique disclosed in PTL 1, there is no need for an additional mechanism or control circuit, resulting in compact and lightweight design of camera units. In addition, there is no need to drive a mechanism, resulting in high-speed measurement.

BRIEF DESCRIPTION OF DRAWINGS

FIG. 1 is a flowchart illustrating a three-dimensional measurement method according to a first embodiment of the present invention.

FIG. 24 is a flowchart illustrating a three-dimensional measurement method according to the seventh embodiment of the present invention.

DESCRIPTION OF EMBODIMENTS

First Embodiment

An embodiment of the present invention will be described with reference to the drawings.

Figure 2A:
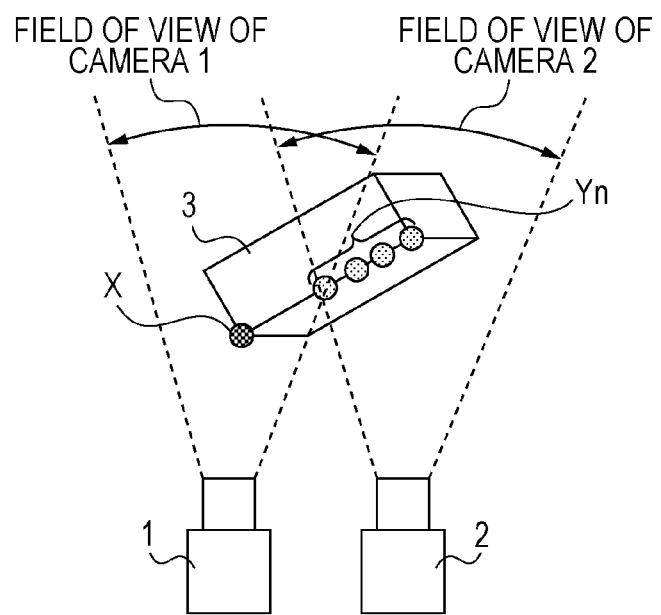
FIG. 2A is a diagram illustrating camera settings according to the first embodiment of the present invention.
Figure 3A:
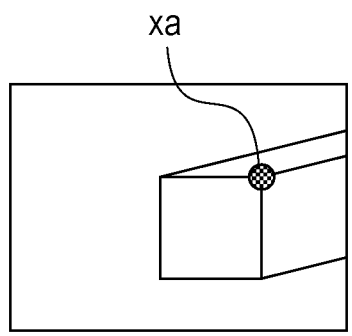
FIG. 3A is a diagram illustrating images captured using two cameras according to the first embodiment of the present invention.
Figure 3B:
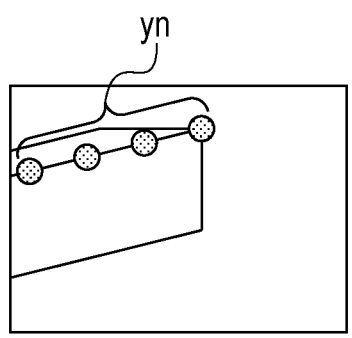
FIG. 3B is a diagram illustrating images captured using two cameras according to the first embodiment of the present invention.

FIG. 1 is a flowchart illustrating a three-dimensional measurement method according to the present invention. FIG. 2A is a diagram illustrating a camera and a measurement target to be measured. FIG. 3A illustrates an image captured using a camera 1 illustrated in FIG. 2A, and FIG. 3B illustrates an image captured using a camera 2 illustrated in FIG. 2A.

Here, a point X illustrated in FIG. 2A is a point on a measurement target (product) 3 to be measured, and may be a point representing a feature of a three-dimensional object, such as a corner, an endpoint, or an intersection of the measurement target 3. A point representing a feature of a target to be measured three-dimensionally, such as the point X, is hereinafter referred to as a "feature point". A plurality of feature points is referred to as a "feature point group". A point xa is a point on an image captured using the camera 1, and is a point that corresponds to the point X illustrated in FIG. 2A and whose image is formed onto a sensor plane of the camera 1. A point on a sensor plane corresponding to a point of a target to be measured three-dimensionally, such as the point xa, is hereinafter referred to as a "corresponding point". A plurality of corresponding points may be referred to as a "corresponding point group".

Figure 2B:
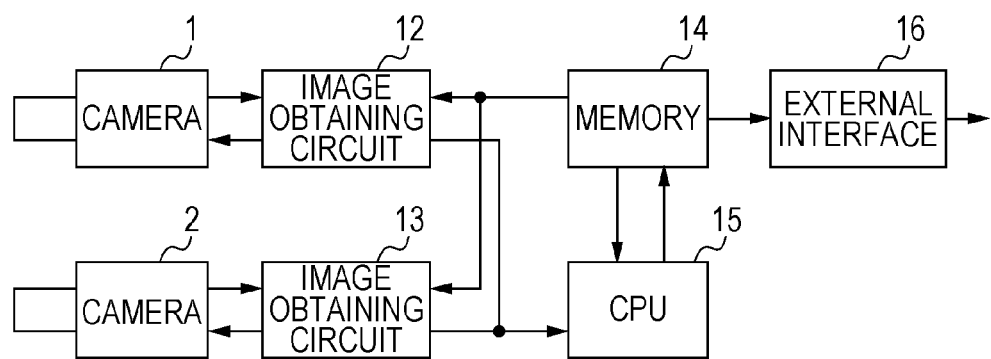
FIG. 2B is a diagram illustrating camera settings according to the first embodiment of the present invention.

FIG. 2B is a block diagram illustrating a configuration for implementing the flowchart of FIG. 1. Cameras 1 and 2 correspond to the cameras 1 and 2 illustrated in FIG. 2A, respectively, and are connected to image obtaining circuits 12 and 13, respectively. The timings for obtaining the images using the image obtaining circuits 12 and 13 are controlled by a central processing unit (CPU) 15, and image information is saved in a memory 14. The obtained image information is read by using the CPU 15 via the memory 14. The CPU 15 executes the process illustrated in the flowchart of FIG. 1 using the read image information, and calculates the three-dimensional coordinates of a feature point. Then, the calculation result is output to an external device via the memory 14 using an external interface 16. Various values measured in step S2, which will be described in detail below, and information about the feature point and the feature point group are stored in the memory 14.

A three-dimensional measurement method according to the present invention will now be described with reference to the individual steps of the flowchart illustrated in FIG. 1. The processing of steps S1 and S2 provides preparation for the three-dimensional measurement method according to the present invention is performed.

(Step S1) Place Two Cameras

FIG. 2A is a diagram illustrating the conditions under which the two cameras 1 and 2 are placed with respect to a feature point X to be measured on the measurement target 3 and a feature point group Yn continuous with the feature point X.

That is, the field of view of at least one camera (in FIG. 2A, the camera 1) includes the feature point X, and the field of view of the other camera (in FIG. 2A, the camera 2) includes the feature point group Yn. The images captured using the cameras 1 and 2 that are placed in the above manner are as in illustrated in FIGS. 3A and 3B, respectively. FIG. 3A illustrates an image captured using the camera 1, which includes a corresponding point xa corresponding to the feature point X, and FIG. 3B illustrates an image captured using the camera 2, which includes a corresponding point group yn corresponding to the feature point group Yn continuous with the feature point X. The term "feature point group continuous with the feature point X" means points on an edge connected to the feature point X. The line extending from the feature point group Yn corresponding to the point group on the edge reaches the feature point X. The feature point group Yn may be selected so that a geometric shape defined by a point group includes the feature point X.

In this embodiment, the measurement target 3 may be a box-like object. Since the measurement target 3 has linear edges, the feature that the feature point group Yn continuous with the feature point X and the corresponding point group yn define a straight line is utilized for the feature point group Yn. That is, the feature that the feature point X is located on the straight line defined by the feature point group Yn is utilized.

The shape of products of industrial mass production and the like is determined in advance, and the edge on which the feature point X is located may be known. Therefore, it may be easy to select the feature point group Yn to be captured using the camera 2 with respect to the feature point X to be captured using the camera 1. Besides an edge, an object drawn on a product surface connected to the feature point X, such as a character or a graphic pattern, may be used.

(Step S2) Calibration

In step S2, calibration is performed using a method similar to a calibration method in an existing stereo measurement method. Calibration can be performed on images captured at different positions that have been changed several times in a space, using a calibration chart on which a pattern whose accurate two-dimensional position is known is printed.

In the calibration step, the lens distortion, sensor pitch, and focal length of each camera, the point at which the optical axis and the sensor plane of each camera intersect, the relative tilt between the optical axes of the two cameras, and the absolute coordinates of a representative point (generally, a point at which the optical axis and the sensor plane of the reference camera intersect) are measured.

Figure 4:
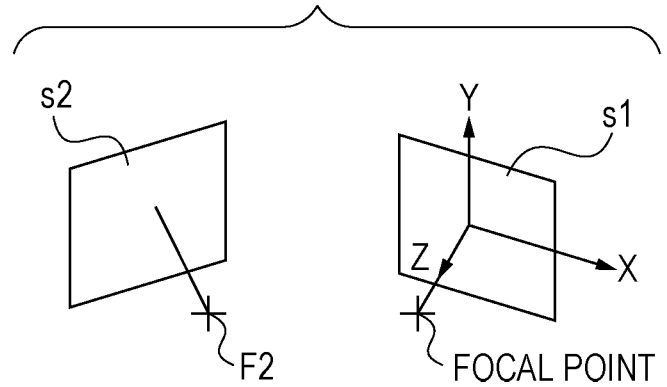
FIG. 4 is a diagram illustrating coordinate axes of camera coordinates according to the first embodiment of the present invention.

In stereo measurement, generally, as illustrated in FIG. 4, a point at which the optical axis and a sensor plane s1 of the reference camera intersect is used as the origin of the camera coordinate system, the x axis is plotted that is a line extending along the long sides of the sensor, the y axis is plotted that is a line extending along the short sides of the sensor, and the z axis coincides with the optical axis.

Among the values obtained in the calibration step described above, the "focal lengths" and the "points at which the optical axes and the sensor planes intersect" of the cameras 1 and 2 can be used to determine the positions of the focal points F1 and F2 of the two cameras in terms of camera coordinates.

In addition, the "points at which the optical axes and the sensor planes intersect" and the "relative tilt between the optical axes of the two cameras" can be used to determine an equation representing the sensor planes s1 and s2 of the cameras in terms of camera coordinates.

If the positional relationship between the two cameras, the focus conditions, the angles of view, and the like are fixed, calibration other than the measurement of the absolute position of the representative point may be performed prior to the placement in step S1.

(Step S3) Capture

In step S3, the feature point X is captured using the two cameras using the conditions set in step S1 to obtain images so that the field of view of at least one of the cameras (in FIG. 2A, the camera 1) includes the feature point X and the field of view of the other camera (in FIG. 2A, the camera 2) includes the feature point group Yn continuous with the feature point X.

(Step S4) Obtain Position of First Corresponding Point xa

In step S4, the position of the corresponding point xa (hereinafter referred to as a "first corresponding point") on the sensor plane s1 of a first camera, which corresponds to the feature point X, is determined from the image captured using the camera in which the feature point X appears among the images captured in step S3 using an existing method.

The first corresponding point xa corresponding to the feature point X may be determined using, for example, a template matching method in which a template image corresponding to a feature point is prepared in advance and in which the calculation of local correlation between the template image and a captured image is performed to determine a corresponding point from the position having the highest degree of correlation.

Alternatively, as illustrated in FIG. 2A, when the feature point is a corner, a method in which outlines representing boundaries on an image are determined and in which the intersection therebetween is set as a corresponding point may also be used.

(Step S5) Obtain Equation of First Straight Line E

Figure 5:
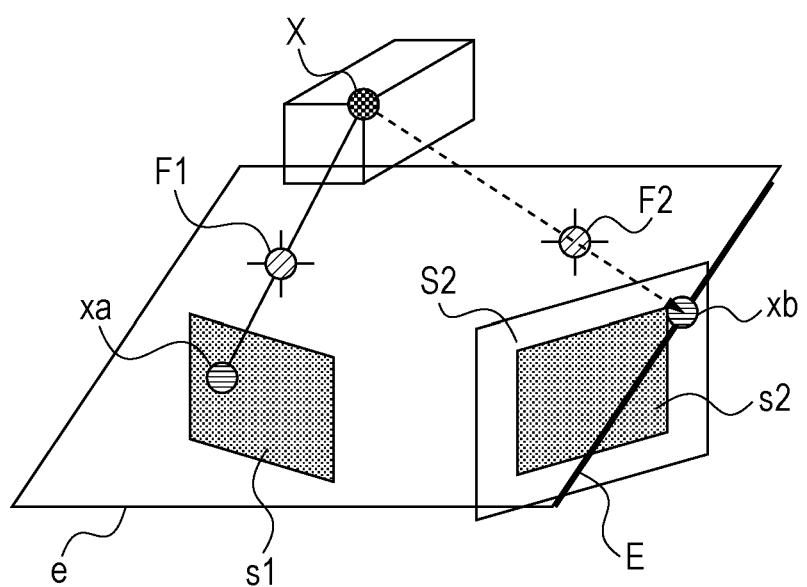
FIG. 5 is a diagram illustrating a method for determining a first straight line according to the first embodiment of the present invention.

In step S5, a straight line E on a plane S2 including a sensor plane s2 illustrated in FIG. 5 is determined using the positions of the focal points F1 and F2 of the cameras, which are determined in step S2, and the position of the first corresponding point xa corresponding to the feature point X, which is determined in step S4.

First, a plane e including the focal points F1 and F2 and the first corresponding point xa is determined. If the two cameras have a normal angle of view (less than an angle of view of 180 degrees(angle)), the points F1, F2, and xa are not aligned in a straight line. Accordingly, the positions of the three points can be used to uniquely determine a plane including the three points. This plane corresponds to the plane e.

According to the principle of camera focus, the image of the feature point X is formed onto the sensor planes s1 and s2 through the focal points F1 and F2, respectively, and therefore the feature point X located on a line extending from a line segment between the focal point F1 and the first corresponding point xa is also located on the plane e. Similarly, a second corresponding point xb corresponding to the feature point X, which is located on a line extending from a line segment between the feature point X and the focal point F2, is also located on the plane e.

The second corresponding point xb corresponding to the feature point X is a point on the line of intersection (in this embodiment, a straight line) between the planes e and S2. The line of intersection is set as the straight line E. The equation of the plane e is given from the above calculation, and the equation of the plane S2 is given from step S2. Therefore, the equation of the straight line E can be determined.

The straight line E is included in the plane S2, and is therefore regarded as a two-dimensional graphic pattern on the plane S2.

The plane e including the two points, that is, the focal points F1 and F2, is called the epipolar plane. The epipolar plane is not determined uniquely. However, since the points F1 and F2 are known in step S2 and is fixed in the subsequent measurement, the amount of calculation of step S5 at each measurement time can be reduced by determining the conditions of the epipolar plane in advance.

(Step S6) Obtain Position of Corresponding Point yn of Feature Point Group Yn

In step S6, the corresponding point group yn is determined using an existing method from, among the images captured in step S3, the image captured using the camera 2 in which the feature point group Yn on a straight line appears. As in step S4, the corresponding point group yn can be determined using an existing method. By way of example, a template matching method or a method in which an outline representing a boundary on an image is determined and in which a point group on the outline is set as the corresponding point group yn may be used.

(Step S7) Obtain Equation of Second Straight Line G

Figure 6A:
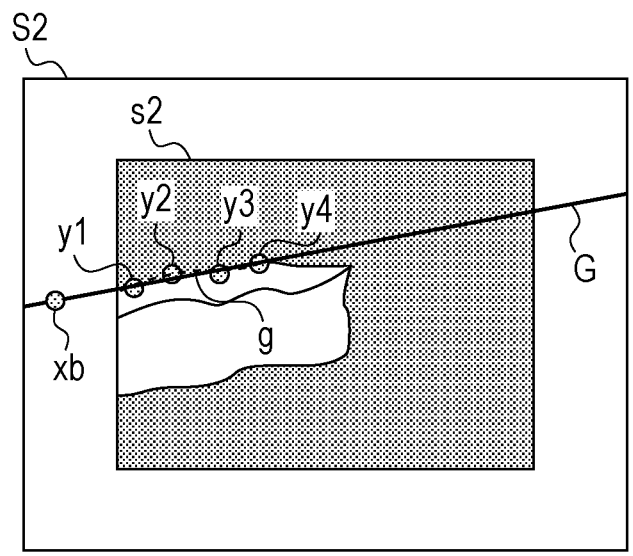
FIG. 6A is a diagram illustrating a method for determining a second straight line according to the first embodiment of the present invention.

In step S7, a straight line G illustrated in FIG. 6A is determined from the corresponding point group yn (in FIG. 6A, corresponding points y1 to y4) on the sensor plane s2 determined in step S6.

While in FIG. 5, a mirror image appears on the sensor plane s2, a normal image is illustrated in FIG. 6A for ease of illustration.

Although the feature point group Yn is located on a straight line, the corresponding point group yn is not located on a straight line due to the measurement error but is located on a curve g. Thus, regression calculation is performed using a method of least squares so as to obtain the minimum error to determine the straight line G on the sensor plane s2.

When the straight line G is extrapolated over the plane S2, the feature point group Yn and the feature point X are located on a straight line, and therefore the second corresponding point xb is located on the straight line G.

While the processing of steps S4, S5, S6, and S7 has been described in this order, as illustrated in FIG. 1, the processing of steps S4 and S5 and the processing of steps S6 and S7 may be executed in parallel. The processing of steps S6 and S7 may be executed earlier.

(Step S8) Obtain Position of Second Corresponding Point xb

Figure 6B:
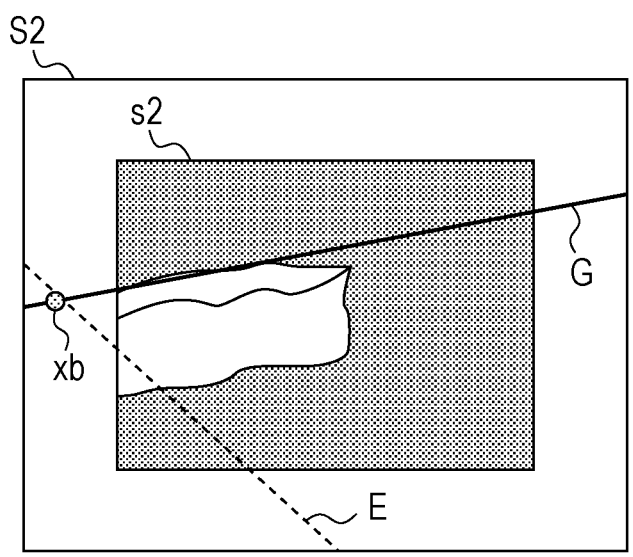
FIG. 6B is a diagram illustrating a method for determining a second straight line according to the first embodiment of the present invention.

The second corresponding point xb corresponding to the feature point X is determined from the straight lines E and G determined in steps S5 and S7. Since the second corresponding point xb corresponding to the feature point X is included in both the straight lines E and G, as illustrated in FIG. 6B, the intersection between the straight lines E and G may be determined and may be set as the second corresponding point xb corresponding to the feature point X.

In this manner, the corresponding point xb is not located on the sensor plane s2 and cannot be directly captured. However, the position of the corresponding point xb can be determined.

(Step S9) Obtain Position of Feature Point X

In step S9, the position of the feature point X is determined from the two corresponding points xa and xb corresponding to the feature point X, which are determined in steps S4 and S8.

Figure 7:
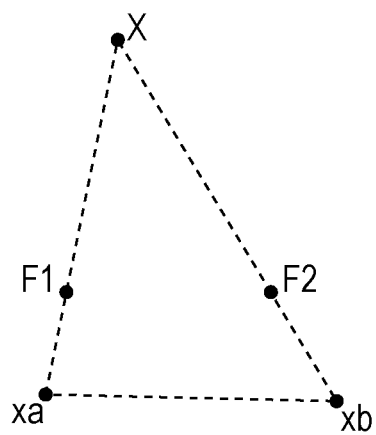
FIG. 7 is a diagram illustrating the principle of the triangulation method.

Here, the well-known triangulation method may be used, which will be described with reference to FIG. 7.

Up to step S9, the positions of the focal points F1 and F2 are determined in step S2, and the two corresponding points xa and xb corresponding to the feature point X are determined in steps S4 and S8.

According to the principle of camera photography, the three points X, F1, and xa are located on a straight line, and the three points X, F2, and xb are also located on a straight line.

In addition, as described in the processing of step S5, the three points X, F1, and F2 are not aligned in a straight line in the measurement using cameras having normal angles of view. For this reason, the points X, xa, and xb define a unique triangle. Thus, the three-dimensional position of the feature point X can be uniquely determined.

Specifically, the spatial vector from the first corresponding point xa to the focal point F1, and the spatial vector from the second corresponding point xb to the focal point F2 may be determined, and may be extrapolated to determine the intersection.

As described above, according to the flowchart illustrated in FIG. 1, the three-dimensional position of a feature point outside a common field of view can be measured using a stereo measurement method.

If a plurality of measurement points are to be determined, the processing of steps S4 to S9 may be repeated.

Figure 8A:
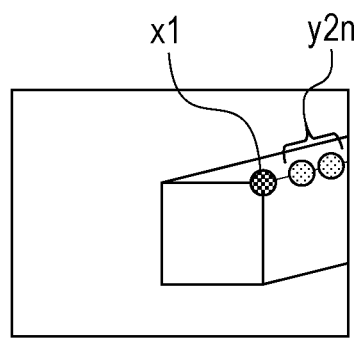
FIG. 8A is a diagram illustrating another example of processing according to the first embodiment of the present invention.
Figure 8B:
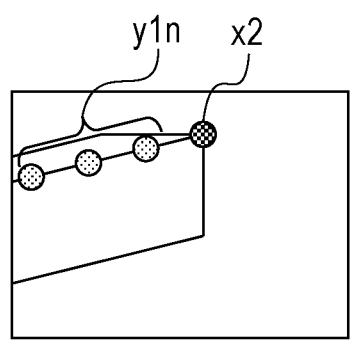
FIG. 8B is a diagram illustrating another example of processing according to the first embodiment of the present invention.

In this case, the feature point may not necessarily appear in an image captured using a camera on the same side. That is, the measurement of the three-dimensional position of feature points X1 and X2, as illustrated in FIGS. 8A and 8B, may be performed. FIG. 8A illustrates an image captured using the camera 1, and FIG. 8B illustrates an image captured using the camera 2.

A corresponding point x1 corresponding to the feature point X1 appears in the image captured using the camera 1, and a corresponding point group y1n corresponding to a feature point group Y1n continuous with feature point X1 appears in the image captured using the camera 2. Further, a corresponding point x2 corresponding to the feature point X2 appears in the image captured using the camera 2, and a corresponding point group y2n corresponding to a feature point group Y2n continuous with the feature point X2 appears in the image captured using the camera 1.

Even in this case, the three-dimensional position of the two points X1 and X2 can be determined in order according to this embodiment.

As described above, in the three-dimensional measurement method according to the present invention, unlike an existing stereo measurement method, a feature point X may not necessarily be located in a common field of view of two cameras. Therefore, advantageously, a wide field-of-view coverage can be supported.

Figure 22:
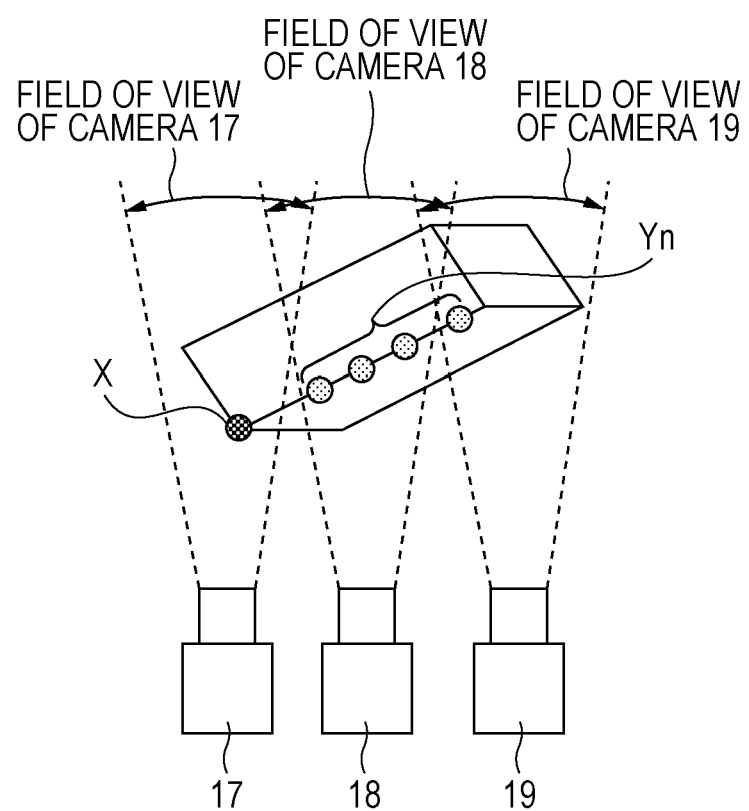
FIG. 22 is a diagram illustrating camera settings according to the sixth embodiment of the present invention.

Furthermore, no need exists to use a wide-angle lens as illustrated in FIG. 22. Therefore, the reduction in accuracy caused by using a wide-angle lens can be avoided.

In a method for measuring a feature point outside a common field of view, a three-dimensional image map may be created in a common field-of-view portion, and a feature point outside the field of view may be determined from continuity of a graphic pattern. In this case, a large amount of calculation may be required to calculate a three-dimensional image. In the stereo method, furthermore, the resolution in the depth direction is inversely proportional to the distance between the cameras, that is, the baseline length. This may generally result in a lower resolution and a lower measurement accuracy than that in two-dimensional measurement. The above method may have difficulties in terms of accuracy.

The method according to the present invention requires no common field-of-view portion, and provides a planar or two-dimensional main calculation of steps S4 to S8, thus allowing a reduced amount of calculation and a high two-dimensional measurement resolution, resulting in, advantageously, high accuracy over the above method.

Second Embodiment

In the first embodiment, a feature point group continuous with a feature point to be measured is located on a straight line. The method described in the first embodiment may be performed if any other line (such as a curve) on an image corresponding to a feature point group Yn continuous with a feature point X is extrapolated using known information.

Figure 9:
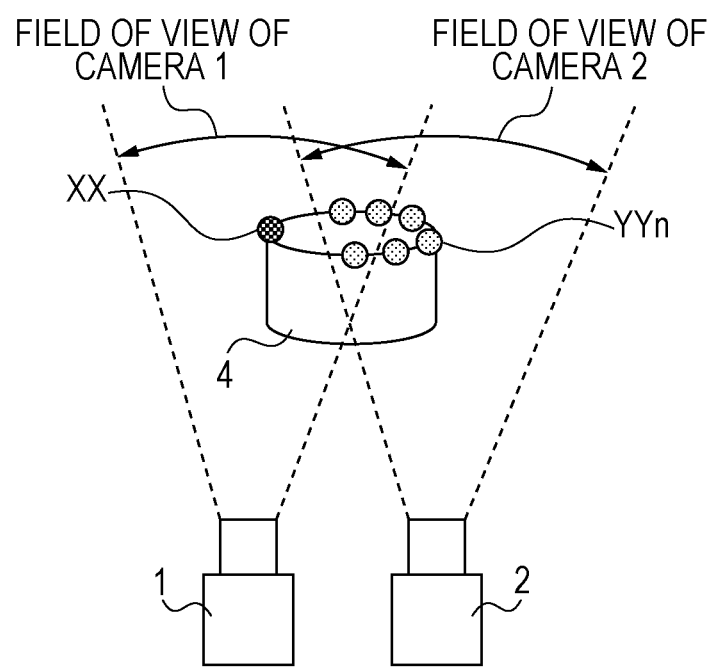
FIG. 9 is a diagram illustrating camera settings according to a second embodiment of the present invention.

For example, as illustrated in FIG. 9, three-dimensional measurement of a feature point XX on a cylinder 4 will be discussed. A camera 1 is placed so that the feature point XX appears in an image captured using the camera 1, and a camera 2 is placed so that at least a feature point group YYn on the circular arc continuous with the feature point XX appears in an image captured using the camera 2.

Figure 10A:
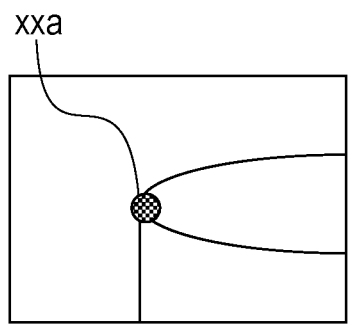
FIG. 10A is a diagram illustrating images captured using two cameras according to the second embodiment of the present invention.
Figure 10B:
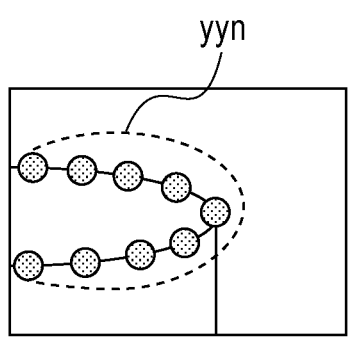
FIG. 10B is a diagram illustrating images captured using two cameras according to the second embodiment of the present invention.

Images captured using the cameras 1 and 2 under the set conditions are illustrated in FIGS. 10A and 10B, respectively. Here, xxa represents a corresponding point appearing in the image captured using the camera 1, which corresponds to the feature point XX, and yyn represents a corresponding point group appearing in the image captured using the camera 2, which corresponds to the feature point group YYn continuous with the feature point XX.

Figure 11:
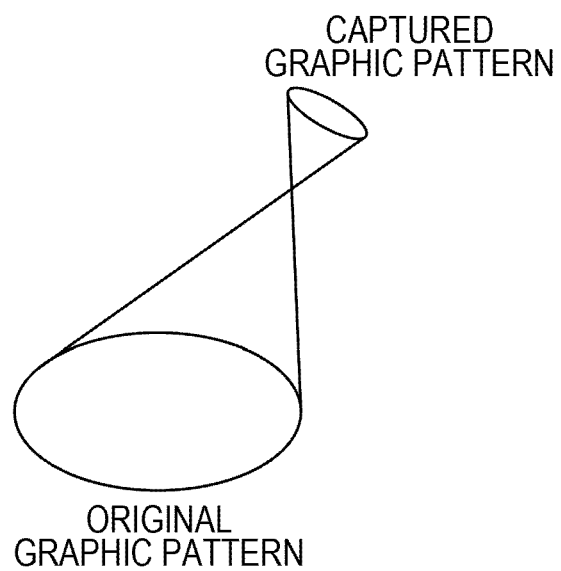
FIG. 11 is a diagram illustrating projective transformation involved in image capture.

As illustrated in FIG. 11, according to the principle of projective transformation, it is known that a cylinder looks as an ellipse when viewed in an oblique direction. That is, according to the known information that the feature point group YYn is located on the circular arc, the corresponding point group yyn corresponding to the feature point group YYn is located on the ellipse.

When an ellipse including a circle is projected onto a two-dimensional plane by image capture, the resulting graphic pattern has also an elliptic shape. That is, through formulation using an elliptic equation or the like as in the case of a straight line, processing similar to that for a straight line can be performed.

Figure 12A:
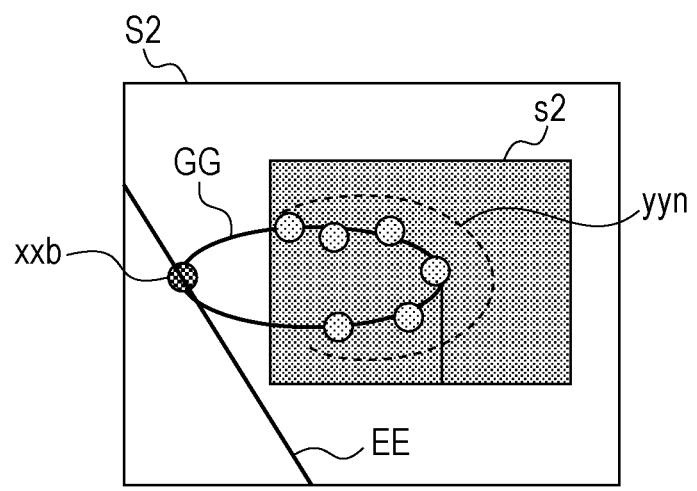
FIG. 12A is a diagram illustrating a method for determining a corresponding point outside a common field of view according to the second embodiment of the present invention.

A method for high-speed and high-accuracy ellipse fitting using a Hough transform or the like is known, and, as illustrated in FIG. 12A, an ellipse GG on a plane S2 including the sensor plane s2 of the camera 2 can be determined from the corresponding point group yyn. Further, similarly to the first embodiment, a straight line EE can be determined from the position of the corresponding point xxa on the image captured using the camera 1, which corresponds to the feature point XX, and the two focal points F1 and F2.

The second corresponding point xxb on the plane S2, which corresponds to the feature point XX, is located on the circular arc of the ellipse GG and is also located on the straight line EE. Therefore, the intersection corresponds to the second corresponding point xxb.

Figure 12B:
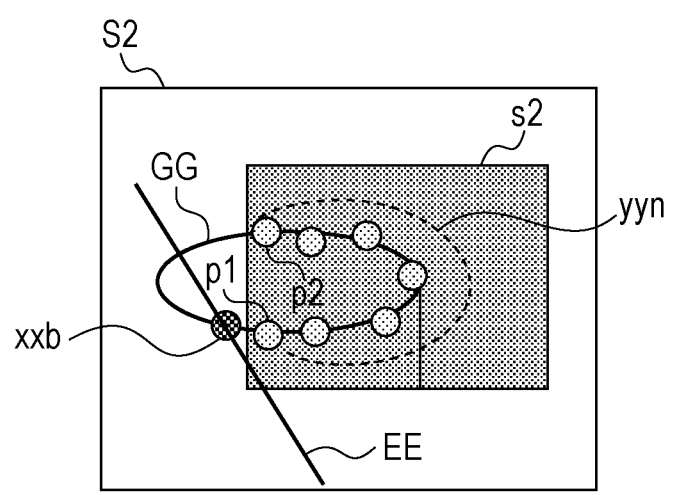
FIG. 12B is a diagram illustrating a method for determining a corresponding point outside a common field of view according to the second embodiment of the present invention.

FIG. 12A illustrates a special case in which the ellipse GG intersects the straight line EE at one point. In actuality, as illustrated in FIG. 12B, the ellipse GG generally intersects the straight line EE at two points. In this case, the point xxb can easily be specified by giving in advance information regarding perspective as to whether the feature point XX is close to or far from the viewer with respect to the sensor plane s2 (in the captured image illustrated in FIG. 12B, p1, p2).

If the ellipse GG and the straight line EE do not intersect due to an error, the point on the straight line EE that is the closest to the circular arc of the ellipse GG may be determined and may be set as the second corresponding point xxb.

Accordingly, the two corresponding points xxa and xxb corresponding to the feature point X are determined. Therefore, as in the first embodiment, the three-dimensional position of the feature point XX outside the common field of view can be measured using the triangulation method.

Since the projective transformation involved in image capture from a three-dimensional space to a two-dimensional space is non-linear, it is generally difficult to determine a curve after transformation with respect to a general curve unless distance information is obtained. However, a straight line, an ellipse including or a circle, and the like may be transformed into a straight line, an ellipse, and the like, whose graphic pattern attribute does not change. Therefore, this embodiment can be achieved. Furthermore, if the regularity of a line connecting a feature point group (for example, points on a polynomial) is known in advance, fitting of the feature point group allows the measurement of the three-dimensional position of a feature point outside a common field of view in a manner similar to that in this embodiment.

Third Embodiment

Figure 13:
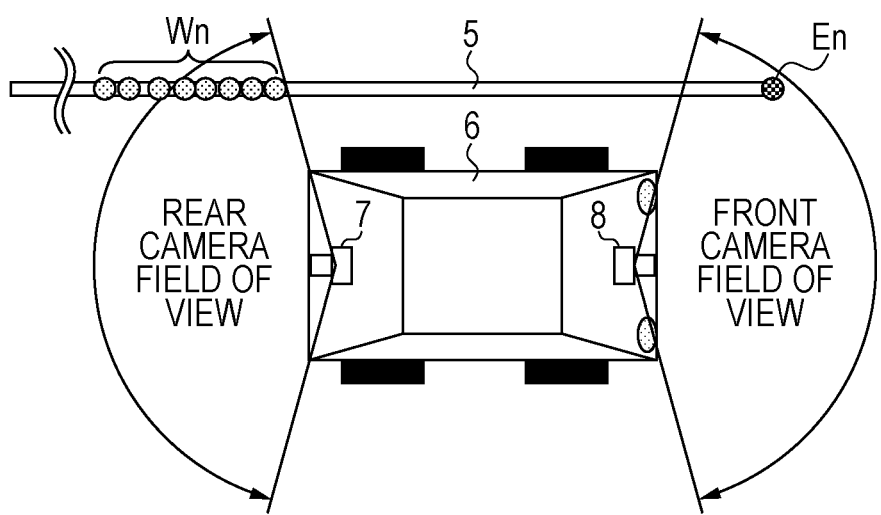
FIG. 13 is a diagram illustrating camera settings according to a third embodiment of the present invention.

FIG. 13 illustrates a third embodiment. A situation in which the three-dimensional position of an end En of a wall 5 is measured using a front camera 8 and a rear camera 7 mounted in a vehicle 6 is illustrated. A feature point En to be measured appears in an image captured using the front camera 8, and a feature point group Wn on the wall 5 continuous with the feature point En appears in an image captured using the rear camera 7. In the illustrated example, furthermore, there is no common field of view between the front camera 7 and the rear camera 8.

Figure 14:
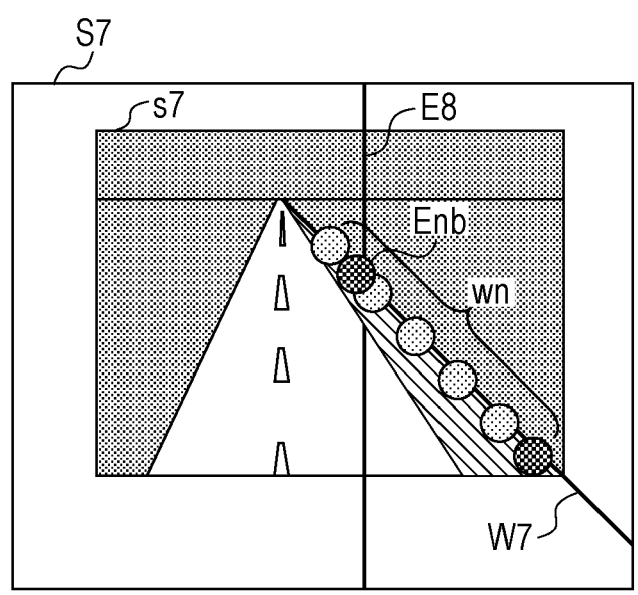
FIG. 14 is a diagram illustrating an image captured using a camera, in which a feature point to be measured does not appear, according to the third embodiment of the present invention.

The image captured using the rear camera 7 may be an image on a sensor plane s7 illustrated in FIG. 14.

As in the first embodiment, a corresponding point Ena (not illustrated) corresponding to the end point En (feature point in this embodiment) of the wall 5 to be measured is determined from the image captured using the front camera 8. A straight line E8 in a plane S7 including the sensor plane s7 of the rear camera 7 is further determined from the point Ena and the focal positions of the two cameras 7 and 8, and a straight line W7 on the plane S7 including the sensor plane s7 is determined from a feature point group wn on the sensor plane s7, which corresponds to a feature point group Wn on the wall 5 continuous with the feature point En. Further, a corresponding point Enb on the plane S7, which corresponds to the feature point En, can be determined by determining the intersection between the straight lines E8 and W7. In FIG. 14, the corresponding point Enb seems to be included in the field of view of the rear camera 7. However, the corresponding point Enb does not actually appear in the image captured using the rear camera 7. That is, the feature point En is located in the direction of a large angle greater than or equal to 90 degrees (angle) from the optical axis of the rear camera 7, and the straight line W7 returns at a point at an angle of 90 degrees (angle).

Accordingly, the three-dimensional position of the feature point En can be measured in a manner similar to that in the first embodiment using the positions of the focal points of the two cameras 7 and 8 and the corresponding points Ena and Enb corresponding to the feature point to be measured.

Since existing three-dimensional measurement requires a common field of view, it is difficult to perform three-dimensional measurement with the above arrangement. Thus, for example, additional cameras having common fields of view to front and rear cameras may be provided on the sides of a vehicle.

According to this embodiment, three-dimensional measurement can be performed without any additional camera.

The embodiment is not limited to two cameras mounted in a vehicle. The embodiment can be applied to any case where two cameras do not share a field of view. This embodiment allows three-dimensional measurement without a field of view being shared between two cameras, thus advantageously providing flexible camera arrangement.

Fourth Embodiment

Figure 15:
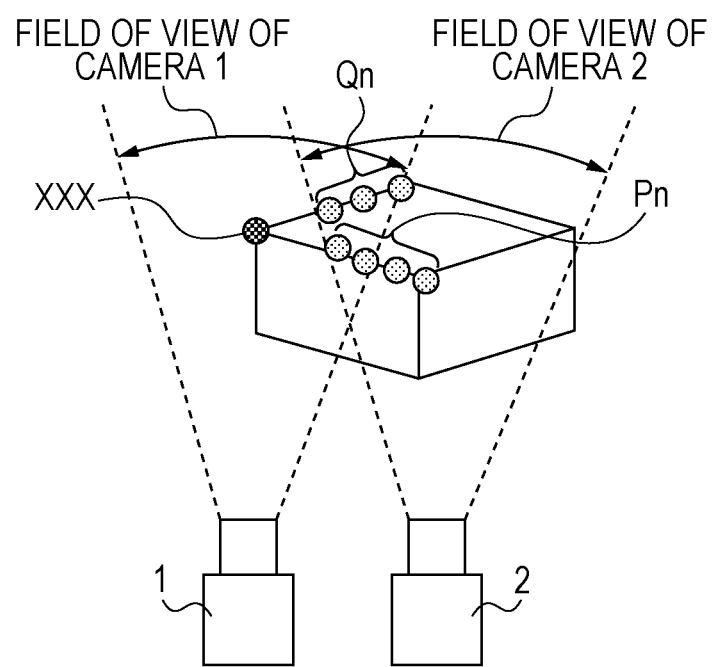
FIG. 15 is a diagram illustrating camera settings according to a fourth embodiment of the present invention.

FIG. 15 is a diagram illustrating a fourth embodiment of the present invention. In FIG. 15, XXX represents a feature point to be measured, Pn represents a feature point group continuous with the feature point XXX, and Qn represents a second feature point group continuous with the feature point XXX. An image captured using a camera 2 under the set conditions may be an image on a sensor plane s2 illustrated in FIG. 16.

Similarly to the first embodiment, a corresponding point xc (not illustrated) corresponding to the feature point XXX is determined from an image captured using a camera 1. A straight line EEE is further determined using the focal positions of the cameras 1 and 2 and the corresponding point xc. Further, a straight line P is determined using a corresponding point pn on the sensor plane s2, which corresponds to the feature point group Pn continuous with the feature point XXX, and a straight line Q is also determined using a corresponding point qn corresponding to the second feature point group Qn continuous with the feature point XXX.

Figure 16:
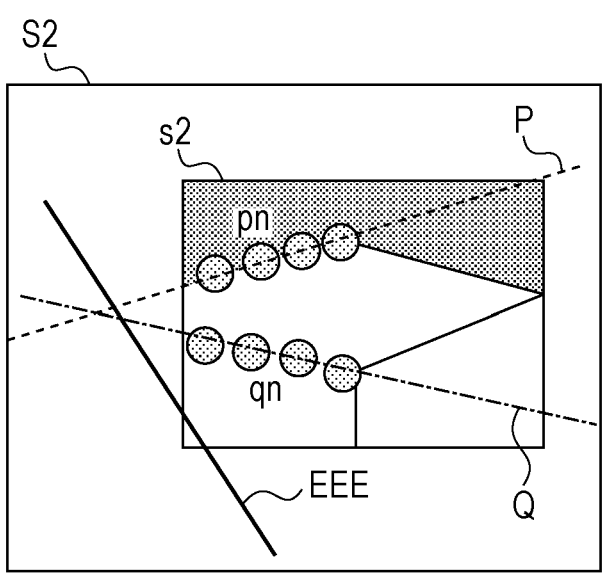
FIG. 16 is a diagram illustrating an image captured using a camera, in which a feature point to be measured does not appear, according to the fourth embodiment of the present invention.
Figure 17:
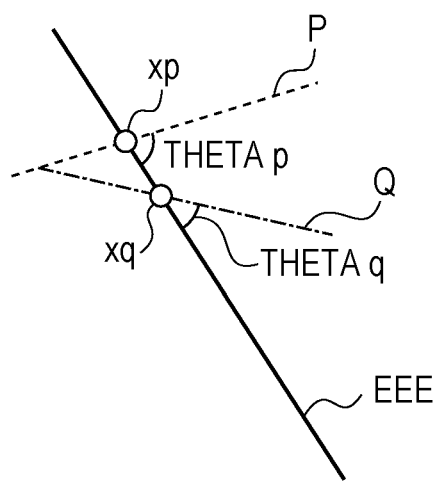
FIG. 17 is a diagram illustrating a method for determining a corresponding point outside a common field of view according to the fourth embodiment of the present invention.

FIG. 17 is a diagram illustrating an area around the intersection of the three straight lines EEE, P, and Q illustrated in FIG. 16. Here, xp and theta p represent the intersection of the straight lines EEE and P and the angle defined by the straight lines EEE and P, respectively. Further, xq and theta q represent the intersection of the straight lines EEE and Q and the angle defined by the straight lines EEE and Q, respectively.

If image measurement can be performed under ideal conditions without image distortion and the straight lines EEE, P, and Q are correctly determined, theoretically, the straight lines EEE, P, and Q intersect at one point. If a measurement error occurs, however, as illustrated in FIG. 17, the above three straight lines do not intersect at one point.

In this case, the intersection having a larger angle defined by two straight lines may be set as a corresponding point xd (not illustrated) corresponding to the feature point XXX, which may be less affected by the error. The reason will now be described with reference to FIG. 18.

Figure 18:
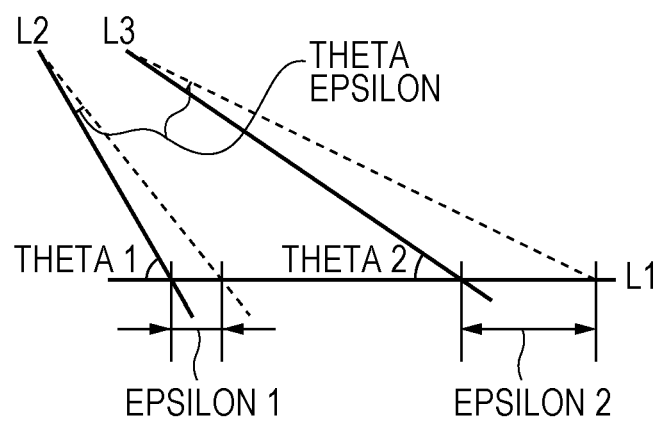
FIG. 18 is a diagram illustrating the accuracy with which an intersection of two straight lines is determined.

Referring to FIG. 18, L1, L2, and L3 represent straight lines, and the angle defined by the straight lines L1 and L2 and the angle defined by the straight lines L1 and L3 are represented by theta 1 and theta 2, respectively, where theta 1>theta 2. It is assumed that the directions of the straight lines L2 and L3 are deviated by the same angle theta epsilon as a measurement error when the two intersections are determined. If the errors are represented by epsilon 1 and epsilon 2, as can be seen from FIG. 18, epsilon 1<epsilon 2 is obtained. That is, a larger angle of intersection when the intersection of two straight lines is determined can be less affected by the error. In this embodiment, theta p>theta q is obtained. Thus, the point xp is set as the corresponding point xd corresponding to the feature point XXX.

Accordingly, the two focal points F1 and F2 and the two corresponding points xc and xd corresponding to the feature point XXX to be measured can be determined. Therefore, the three-dimensional position of the feature point XXX can be measured using the triangulation method in a manner similar to that in the first embodiment.

In particular, since the position of the corresponding point xd outside the common field of view can be more accurately determined than that in the first embodiment, advantageously, the accuracy of three-dimensional measurement can be improved.

In the foregoing description, two feature point groups are used to determine the corresponding point xd, by way of example. However, three or more feature point groups may be used in this embodiment.

In addition, in the first embodiment, when the straight lines E and G are parallel, the straight lines E and G have no intersection, and therefore a singularity at which a corresponding point is no t defined is present. In this embodiment, a plurality of feature point groups are selected so as not to be located on straight lines. Thus, the straight lines defined by the feature point groups are not parallel. Therefore, a corresponding point outside a common field of view, which serves as an intersection of two straight lines, is always defined, and, advantageously, a singularity is not present.

Fifth Embodiment

A fifth embodiment is different from the fourth embodiment in terms of the determination of a corresponding point outside a field of view. The difference will be described with reference to FIG. 19.

Figure 19:
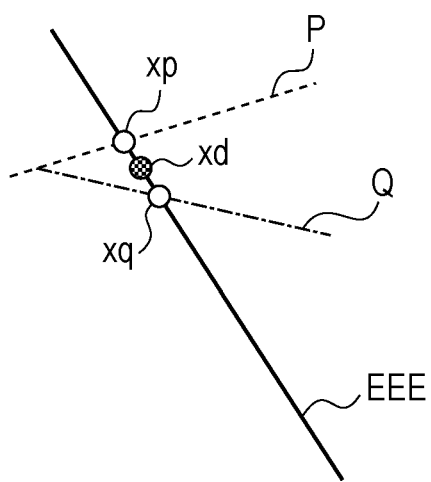
FIG. 19 is a diagram illustrating a method for determining a corresponding point outside a common field of view according to a fifth embodiment of the present invention.

FIG. 19 corresponds to FIG. 17 illustrating the fourth embodiment, in which the same symbols represent the same elements. Here, the point xd corresponding to the feature point XXX outside the field of view is located on the straight line EEE, and is selected as the center of gravity of the points xp and xq. If an error is caused by random variations, due to the averaging effect, the influence of noise can be stochastically reduced. Also in this embodiment, therefore, like the fourth embodiment, advantageously, higher measurement accuracy than that in the first embodiment can be achieved. In addition, like the fourth embodiment, a plurality of feature point groups are not selected so as not to be located on straight lines, and, advantageously, a singularity is not present.

The distinction from the fourth embodiment is as follows: For example, when the number of corresponding point groups used to determine the straight line P illustrated in FIG. 19 is small, the error of the straight line P may be large. In this case, it may be more advantageous to use this embodiment. In addition, even when the equivalent measurement accuracy of the straight lines P and Q is predicted, if the angle defined by the straight lines P and EEE and the angle defined by the straight lines Q and EEE are substantially equal, it may be more advantageous to use this embodiment because of the large random error averaging effect.

Sixth Embodiment

Figure 20:
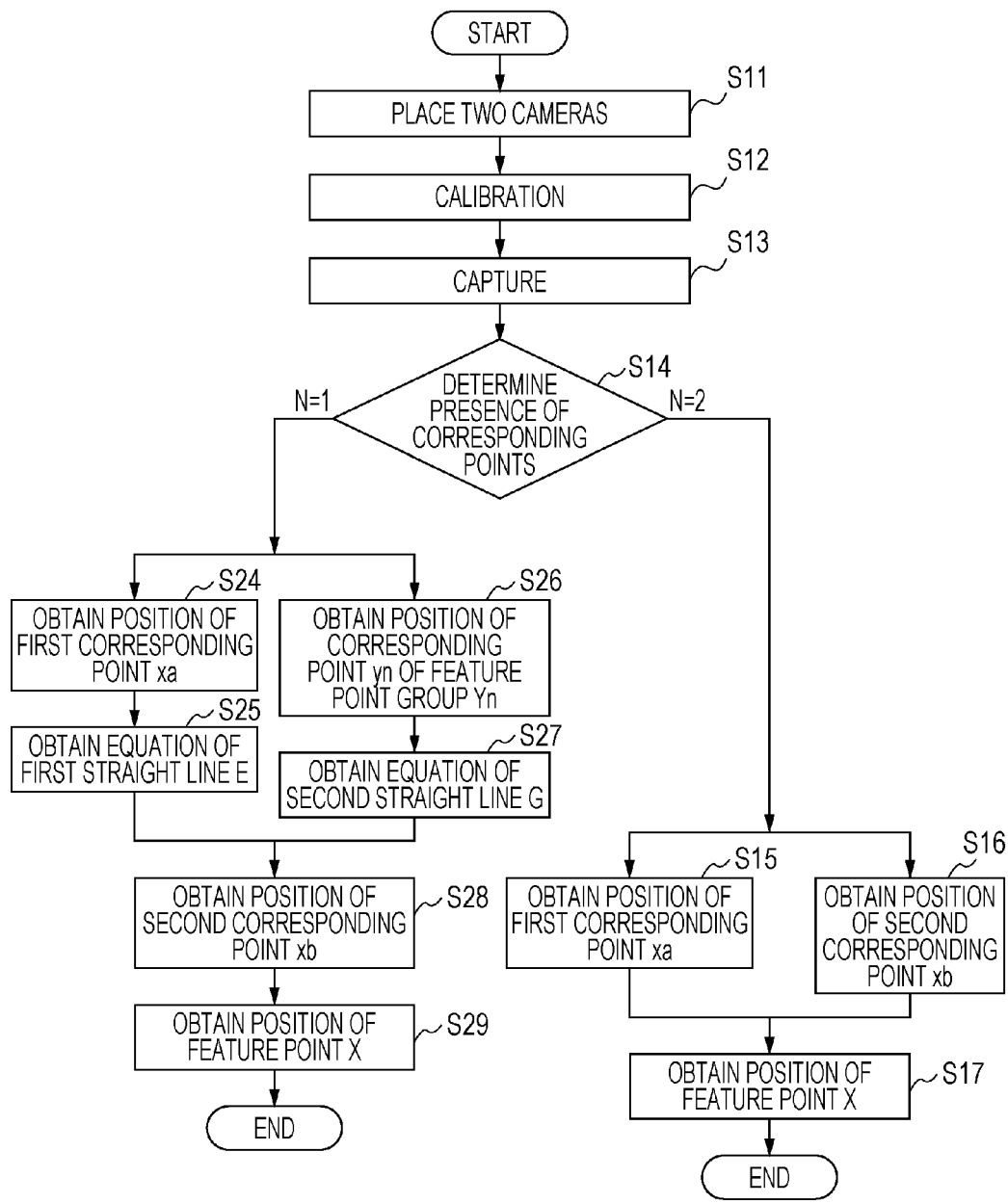
FIG. 20 is a flowchart illustrating a three-dimensional measurement method according to a sixth embodiment of the present invention.

FIG. 20 is a flowchart illustrating a sixth embodiment. The processing of steps S11 to S13 may correspond to the processing of steps S1 to S3 in the first embodiment, and the same or similar advantages may be achieved, which will not be described herein.

In step S14, it is determined whether or not images captured using two cameras always include a corresponding point to be measured. Here, symbol N represents the number of images that always include a corresponding point. That is, N=2 means that both images always include a corresponding point, and N=1 means that one of the images always includes a corresponding point. With the settings of step S11, it is guaranteed that the number of images N is greater than or equal to 1. If N=2 is determined, a feature point to be measured appears in the images captured using both two cameras. Thus, a general stereo measurement method, that is, the processing of steps S15 to S17, is performed. In steps S15 and S16, a corresponding point corresponding to a feature point to be measured is directly calculated from each of the images captured using the two cameras in a manner similar to that in step S4 according to the first embodiment.

If two corresponding points can be determined, then, in step S17, which may be the same as step S9 according to the first embodiment, the three-dimensional position of the feature point can be measured.

If N=1 is determined, the processing of steps S24 to S29, which may correspond to the processing of steps S4 to S9 according to the first embodiment, is performed. The details of the processing are similar to those in the first embodiment, and will not be described herein.

Accordingly, if it is determined that the feature point to be measured always appears in both the two images, the corresponding point is measured directly, thus achieving higher speed measurement than that in the first embodiment.

Next, an example of a method for determining whether or not a corresponding point corresponding to a feature point to be measured is always included in each image will be described.

Figure 21A:
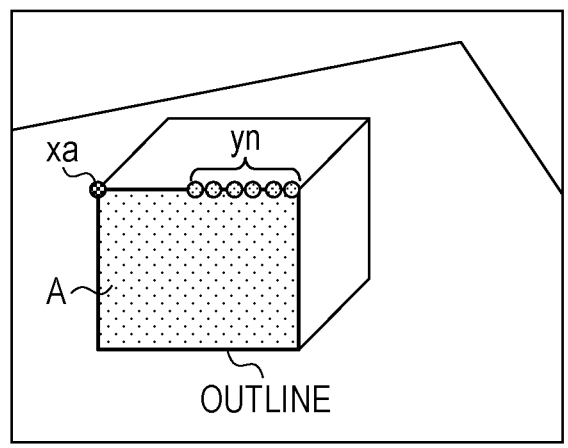
FIG. 21A is a diagram illustrating a method for determining the attribute of an area according to the sixth embodiment of the present invention.
Figure 21B:
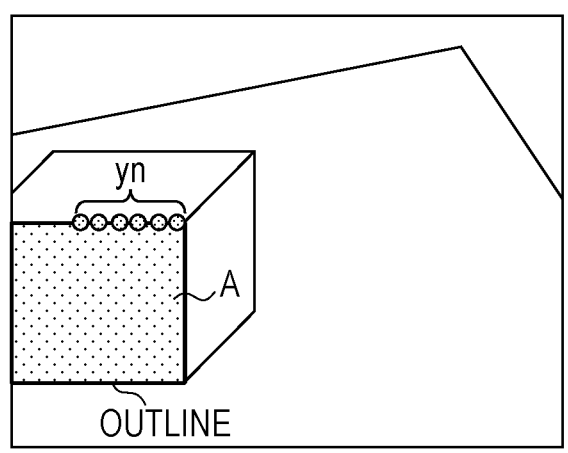
FIG. 21B is a diagram illustrating a method for determining the attribute of an area according to the sixth embodiment of the present invention.

First, in step S11, an outline of a graphic pattern (a graphic pattern corresponding to a product) appearing in an image obtained by a camera that is set so that a feature point group Yn continuous with a feature point X appears in the image is determined using well-known edge processing. Then, as illustrated in FIGS. 21A and 21B, an outline including a corresponding point group yn corresponding to the feature point group Yn is determined, and it is determined whether or not the outline defines a closed area. An area A illustrated in FIG. 21A is a closed area, and an area A illustrated in FIG. 21B is not a closed area.

If the area A is not a closed area, the corresponding point corresponding to the feature point X may not necessarily be located on the screen. Thus, N=1 is determined.

If the area A is a closed area, it is determined whether or not the area A satisfies the attribute of the graphic pattern to which the feature point X belongs. The term "attribute" refers to a combination of at least one of the area, brightness, shape (such as n-sided polygon or ellipse), and other suitable factors. If it is determined that the area A satisfies the attribute of the graphic pattern to which the feature point X belongs, a corresponding point corresponding to the feature point X is always present in the image. Thus, N=2 is determined.

Through the above procedure, it can be determined whether or not a corresponding point corresponding to the feature point X is always present in an image.

Seventh Embodiment

Figure 23A:
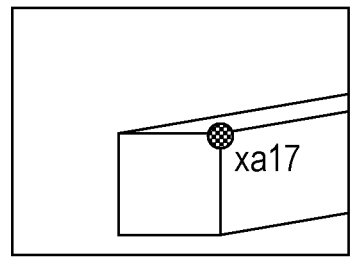
FIG. 23A is a diagram illustrating images captured using three cameras according to a seventh embodiment of the present invention.
Figure 23B:
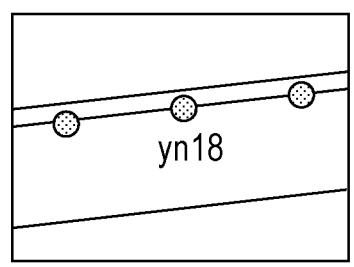
FIG. 23B is a diagram illustrating images captured using three cameras according to a seventh embodiment of the present invention.
Figure 23C:
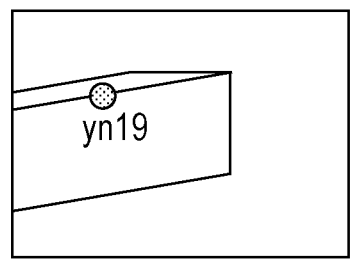
FIG. 23C is a diagram illustrating images captured using three cameras according to a seventh embodiment of the present invention.

FIG. 22 is a diagram illustrating the configuration of a seventh embodiment. Three cameras 17, 18, and 19 capture images of a single work. A point X is a feature point whose three-dimensional position is to be measured, a point group Yn is a feature point group continuous with the feature point X. In this case, the point group Yn defines a straight line. In the configuration illustrated in FIG. 22, the images captured using the cameras 17, 18, and 19 may be as illustrated in FIGS. 23A, 23B, and 23C, respectively. Here, a point xa17 is a point on the image captured using the camera 17, which corresponds to the feature point X. Points yn18 and yn19 are points on the images captured using the cameras 18 and 19, respectively, which correspond to the feature point group Yn. In this case, the points yn18 and yn19 are on a straight line. FIG. 24 is a flowchart illustrating the seventh embodiment. The processing of steps S30 to s34 corresponds to the processing of steps S1 to S5 in the first embodiment, and the same or similar advantages may be achieved, which will not be described herein.

In step S35, the processing described with reference to step S6 in the first embodiment is performed for the cameras 18 and 19. As a result, corresponding point groups yn18 and yn19 are obtained from the respective images. Then, step S36, the line length of each corresponding point group yn on the image captured using the corresponding camera is determined. Then, in step S37, the largest line length is selected. In this embodiment, the straight line on the image obtained by the camera 18 is determined. The equation of this straight line is determined using a method similar to that in step S7 in the first embodiment.

In step S38, the two-dimensional coordinates of a second corresponding point on a plane including the sensor plane of the camera 18, which corresponds to the feature point X, can be determined using a method similar to that in step S8 in the first embodiment using the equations of the two straight lines determined in steps S34 and S37. In step S39, the three-dimensional coordinates of the feature point X can be determined according to the principle of triangulation using a method similar to that in step S9 in the first embodiment from the positional relationships between the two corresponding points corresponding to the feature point X and the two cameras.

According to this embodiment, with respect to a first camera (camera 17) that captures a feature point X, a camera capable of obtaining the largest amount of information about a feature point group Yn among other cameras (cameras 18 and 19) can be automatically selected as a second camera. Therefore, improvement in accuracy can be expected. In addition, with the use of a plurality of cameras, a wider range of three-dimensional measurement can be achieved.

In the foregoing description, three cameras are placed in parallel, by way of example. However, the present invention is not limited thereto. That is, a similar embodiment can be implemented using a plurality of cameras more than two that are arranged at desired positions.

Eighth Embodiment

Also in an eighth embodiment, similarly to the seventh embodiment, a configuration as illustrated in FIG. 22 may be used, and the images captured using the cameras may be as illustrated in FIGS. 23A to 23C. The eighth embodiment will now be described with reference to FIGS. 22, 23A to 23C, and 25. Similarly to the seventh embodiment, the number of cameras and the positions of the cameras are not to be limited to those described herein.

Figure 25:
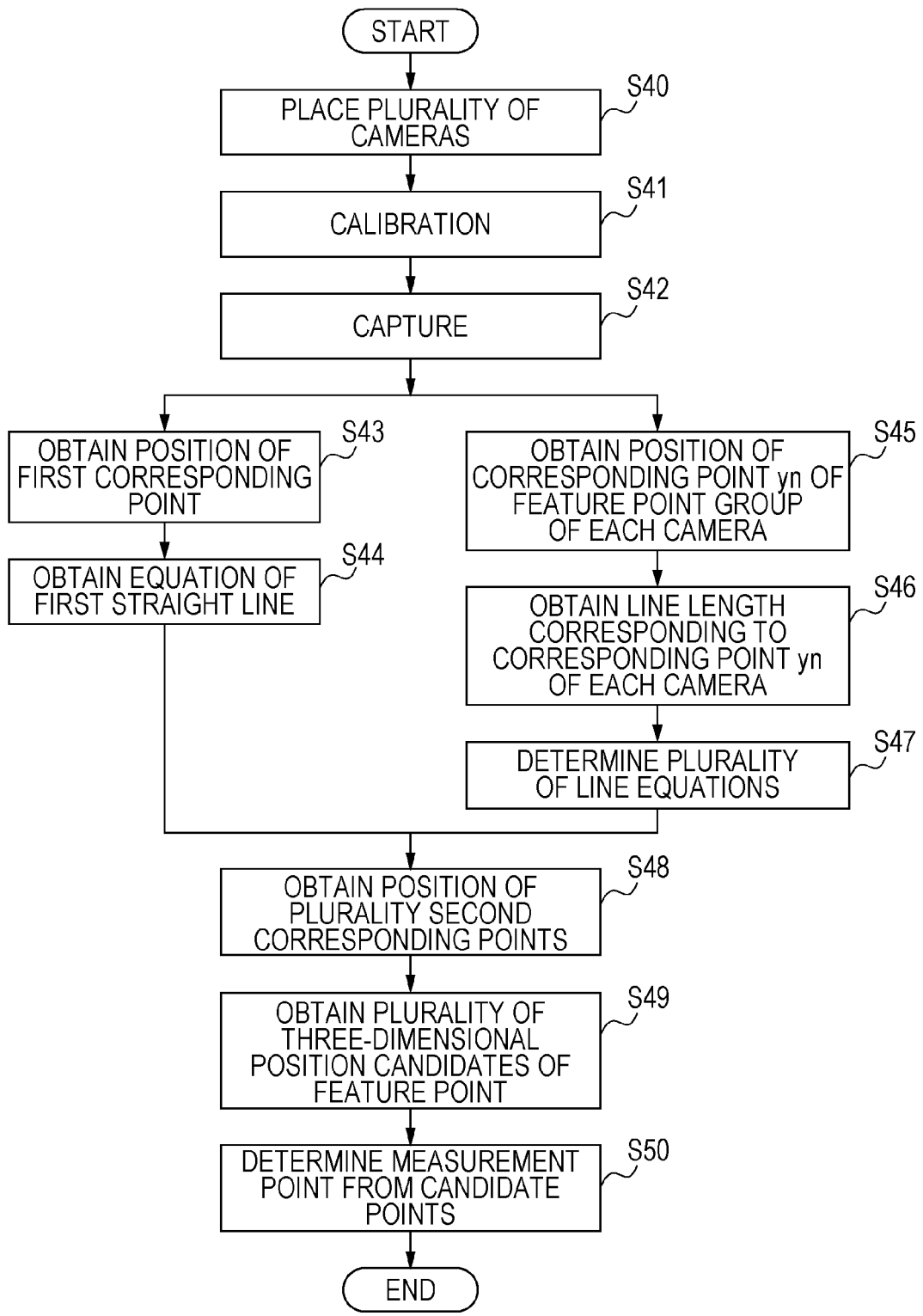
FIG. 25 is a flowchart illustrating a three-dimensional measurement method according to an eighth embodiment of the present invention.

FIG. 25 is a flowchart illustrating a process flow according to the eighth embodiment. The processing of steps S40 to S44 may correspond to the processing of steps S1 to S5 in the first embodiment and the processing of steps S45 and S46 may correspond to the processing of steps S35 and S36 in the seventh embodiment, and same or similar advantages may be achieved, which will not be described herein.

In step S47, one or more line lengths longer than a specified length among the line lengths determined in step S46 are selected, and a two-dimensional line equation on each image plane is determined. Thus, data from a camera for which the likelihood of the equation is low because of the length of the straight line is not sufficient can be excluded.

In step S48, the position of the second corresponding point is obtained using a method similar to that in step S8 in the first embodiment from the line equation determined in step S44 and the line equations determined in step S47. Since there are a plurality of line equations selected in step S47 and corresponding cameras, a plurality of second corresponding points may be determined.

In step S49, a candidate point of the three-dimensional measurement position of the feature point X is determined in a method similar to that in step S9 in the first embodiment from the first corresponding point determined in step S43 and the second corresponding points determined in step S48. Since there are a plurality of second corresponding points determined in step S48, a plurality of candidate points may be obtained.

In step S50, the true measurement position of the feature point X is determined by taking the three-dimensional center of gravity from the plurality of three-dimensional measurement position candidates determined in step S49. The center of gravity may be determined not only by averaging weights for individual points but also by assigning weights in accordance with the line length. That is, improved reliability can be achieved by assigning a high weight to information obtained a more likely image. For example, weights may be assigned in accordance with the line length.

In this embodiment, even if each camera has a narrow field of view, a large amount of information can be obtained when a feature point group Yn is found, and therefore, advantages equivalently similar to those of a camera having a wide field of view can be achieved. More reliable three-dimensional measurement can be provided.

A three-dimensional measurement method according to the present invention can be suitably used for a camera with a serious upper limit on the weight of the camera with the demand of high measurement accuracy and wide view angle, such as an on-hand camera used in an industrial robot hand.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A three-dimensional measurement method for measuring three-dimensional coordinates of a feature point of a measurement target using at least two cameras in accordance with a stereo measurement method, comprising the steps of:

capturing the feature point using a first camera, and capturing a feature point group continuous with the feature point using a second camera based on data of a predetermined shape of the measurement target, wherein the feature point is not within a field of view of the second camera;

calculating a plane including a corresponding point on a sensor plane of the first camera, the corresponding point corresponding to the feature point, a focal position of the first camera, and a focal position of the second camera, and calculating a first line that is a line of intersection of the calculated plane and a plane including a sensor plane of the second camera;

calculating a second line including a corresponding point group on the sensor plane of the second camera, the corresponding point group corresponding to the feature point group;

calculating a corresponding point on the plane including the sensor plane of the second camera, the corresponding point on the plane including the sensor plane of the second camera corresponding to the feature point, by determining an intersection of the first line and the second line; and calculating a straight line extending through the corresponding point on the sensor plane of the first camera and the focal position of the first camera, and a straight line extending through the corresponding point group on the sensor plane of the second camera and the focal position of the second camera, and calculating an intersection of the calculated straight lines as three-dimensional coordinates of the feature point.

2. The three-dimensional measurement method according to claim 1, wherein a plurality of feature point groups are continuous with the feature point, wherein in the step of calculating a second line, a second line is calculated for each of a plurality of corresponding point groups on the sensor plane of the second camera, the plurality of corresponding point groups corresponding to the plurality of feature point groups, and wherein in the step of calculating a corresponding point on the plane including the sensor plane of the second camera, the corresponding point is calculated from intersections of the first line and the plurality of second lines.

3. The three-dimensional measurement method according to claim 2, wherein an intersection of the first line and one of the second lines, the one of the second lines being a second line for which an angle defined with respect to the first line is largest, is set as a corresponding point on the sensor plane of the second camera, the corresponding point corresponding to the feature point.

4. The three-dimensional measurement method according to claim 2, wherein in the step of calculating a corresponding point on the plane including the sensor plane of the second camera, a centroid of the intersections of the first line and the plurality of second lines is calculated as the corresponding point.

5. The three-dimensional measurement method according to claim 1, wherein the second line comprises a straight line.

6. The three-dimensional measurement method according to claim 1, wherein the second line comprises a curve.

7. The three-dimensional measurement method according to claim 1, further comprising the step of:
determining whether or not a corresponding point corresponding to the feature point is included in each of images captured using the at least two cameras.

8. The three-dimensional measurement method according to claim 7, wherein in the step of determining, an outline that is an outline of a graphic pattern in each of the images captured using the at least two cameras, the graphic pattern corresponding to the measurement target, the outline including the feature point group, is calculated, and it is determined whether or not the calculated outline defines a closed area.

9. The three-dimensional measurement method according to claim 1, wherein a plurality of cameras capture a feature point group continuous with the feature point, and
wherein a camera capable of obtaining an image in which the second line has a longest length is selected as the second camera.

10. The three-dimensional measurement method according to claim 1, further comprising the step of:
calculating, based on second lines obtained by a plurality of second cameras, the plurality of second cameras being capable of obtaining an image in which the second line has a length larger than a predetermined value, a weighted centroid of a plurality of three-dimensional coordinate candidates of the feature point as true three-dimensional coordinates of the feature point.

* * * * *